(12) United States Patent
Crawford et al.

(10) Patent No.: US 11,288,245 B2
(45) Date of Patent: *Mar. 29, 2022

(54) TELEMETRY DEFINITION SYSTEM

(71) Applicant: Microsoft Technology Licensing, LLC, Redmond, WA (US)

(72) Inventors: Brian R. Crawford, Seattle, WA (US); Amy M. Lewis, Sammamish, WA (US); Ravi C. Shahani, Bellevue, WA (US); Mahmood G. Qadir, Redmond, WA (US); Wojtek Kozaczynski, Duvall, WA (US); William M. Zintel, Woodinville, WA (US); George Joy, Kirkland, WA (US); Brian P. Ellis, Sammamish, WA (US); Ken Ming-Kin Yip, Bellevue, WA (US); Vitaliy Titov, Redmond, WA (US); James O. Todd, Redmond, WA (US); Mark E. Russinovich, Hunts Point, WA (US); Vito J. Sabella, Bellevue, WA (US); Christopher M. Lang, Bellevue, WA (US); Jonathan K. Johnson, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

This patent is subject to a terminal disclaimer.

(21) Appl. No.: 14/885,970

(22) Filed: Oct. 16, 2015

(65) Prior Publication Data
US 2017/0109379 A1  Apr. 20, 2017

(51) Int. Cl.
G06F 16/22 (2019.01)
G06F 16/23 (2019.01)
G06F 11/30 (2006.01)

(52) U.S. Cl.
CPC .......... *G06F 16/22* (2019.01); *G06F 11/3006* (2013.01); *G06F 11/3072* (2013.01);
(Continued)

(58) Field of Classification Search
CPC .. G06F 11/30; G06F 11/3072; G06F 11/3006; G06F 17/30313; G06F 17/303377; G06F 16/22; G06F 16/2379
(Continued)

(56) References Cited

U.S. PATENT DOCUMENTS 6,263,268 B1  7/2001  Nathanson
6,338,011 B1  1/2002  Furst et al.
(Continued)

FOREIGN PATENT DOCUMENTS

CN  101102535 A  1/2008
CN  101320350 A  12/2008
(Continued)

OTHER PUBLICATIONS

Office Action for U.S. Appl. No. 14/885,969 dated Jun. 21, 2017 (27 pgs.).
(Continued)

*Primary Examiner* — Robert W Beausoliel, Jr.
*Assistant Examiner* — Pedro J Santos
(74) *Attorney, Agent, or Firm* — Dicke, Billig & Czaja, PLLC (57) ABSTRACT

A method of operating a telemetry system includes automatically populating a first set of fields in a schema of an event definition using a logging library of the telemetry system, and populating a second set of fields in the schema selected by an event author.

20 Claims, 4 Drawing Sheets

(52) U.S. Cl.
CPC ...... *G06F 16/2379* (2019.01); *G06F 11/3082* (2013.01); *G06F 2201/86* (2013.01); *G06F 2201/865* (2013.01)

(58) Field of Classification Search
USPC ......... 707/999.01, 803, 999.1, 999.104, 756, 707/755
See application file for complete search history.

(56) References Cited

U.S. PATENT DOCUMENTS

| | | | |
|---|---|---|---|
| 6,920,461 | B2 | 7/2005 | Hejlsberg et al. |
| 7,970,890 | B1 | 6/2011 | Krivopaltsev et al. |
| 8,504,674 | B2 | 8/2013 | Vaught |
| 8,547,246 | B2 | 10/2013 | Menezes et al. |
| 8,601,155 | B2 | 12/2013 | Toombs et al. |
| 8,898,178 | B2 | 11/2014 | Kyomasu et al. |
| 8,953,600 | B2 | 2/2015 | Groves, Jr. |
| 9,038,014 | B2 | 5/2015 | Sivaramakrishnan et al. |
| 9,055,030 | B2 | 6/2015 | Field et al. |
| 2003/0162523 | A1 | 8/2003 | Kapolka et al. |
| 2004/0255301 | A1* | 12/2004 | Turski ............... G06F 17/30607 719/316 |
| 2005/0223366 | A1 | 10/2005 | Smith et al. |
| 2006/0047545 | A1* | 3/2006 | Kumar ................... G06Q 90/00 340/572.1 |
| 2006/0161460 | A1* | 7/2006 | Smitherman ......... G06F 19/327 705/3 |
| 2006/0206698 | A1 | 9/2006 | Foucher et al. |
| 2007/0006174 | A1 | 1/2007 | Sohm et al. |
| 2007/0142008 | A1 | 6/2007 | Bedenko |
| 2007/0294208 | A1* | 12/2007 | Chowdhary ...... G06F 17/30306 |
| 2008/0276131 | A1 | 11/2008 | Bantz et al. |
| 2008/0320012 | A1* | 12/2008 | Loving ............. G06F 17/30297 |
| 2009/0010235 | A1 | 1/2009 | Huh et al. |
| 2010/0194588 | A1 | 8/2010 | Menezes et al. |
| 2011/0087767 | A1 | 4/2011 | Sonkin et al. |
| 2011/0238812 | A1 | 9/2011 | Vaught |
| 2012/0117116 | A1* | 5/2012 | Jacobson .......... G06F 17/30657 707/792 |
| 2012/0245715 | A1 | 9/2012 | Short |
| 2013/0036404 | A1 | 2/2013 | Shu et al. |
| 2013/0066448 | A1 | 3/2013 | Alonso |
| 2013/0081065 | A1* | 3/2013 | Sharan ................ G06F 11/3006 719/318 |
| 2013/0117011 | A1 | 5/2013 | Ahmed et al. |
| 2013/0125096 | A1 | 5/2013 | Kruetzfeldt et al. |
| 2014/0047064 | A1 | 2/2014 | Maturana et al. |
| 2014/0075506 | A1 | 3/2014 | Davis et al. |
| 2014/0137240 | A1 | 5/2014 | Smith et al. |
| 2014/0156520 | A1 | 6/2014 | Kelly et al. |
| 2014/0298107 | A1 | 10/2014 | Dreyfoos et al. |
| 2014/0317454 | A1 | 10/2014 | Gataullin et al. |
| 2014/0344269 | A1 | 11/2014 | Dong et al. |
| 2014/0380282 | A1 | 12/2014 | Ravindranath sivalingam et al. |
| 2015/0046512 | A1 | 2/2015 | Ashby et al. |
| 2015/0095298 | A1 | 4/2015 | Mann |
| 2015/0193477 | A1* | 7/2015 | Dumant ............ G06F 17/30292 707/609 |
| 2015/0339388 | A1 | 11/2015 | Carlson et al. |
| 2015/0339570 | A1 | 11/2015 | Scheffler |
| 2017/0011177 | A1 | 1/2017 | Corpier et al. |
| 2017/0109259 | A1 | 4/2017 | Lewis et al. |
| 2017/0109380 | A1 | 4/2017 | Crawford et al. |
| 2017/0116068 | A1 | 4/2017 | Damron et al. |
| 2017/0187782 | A1 | 6/2017 | Crawford et al. |
| 2017/0228447 | A1 | 8/2017 | Catania et al. |
| 2021/0173761 | A1 | 6/2021 | Lewis et al. |

FOREIGN PATENT DOCUMENTS

| | | |
|---|---|---|
| CN | 102256290 A | 11/2011 |
| CN | 102664749 A | 9/2012 |
| CN | 102685182 | 9/2012 |
| CN | 102999418 A | 3/2013 |
| CN | 103348598 A | 10/2013 |
| CN | 103795711 A | 5/2014 |
| CN | 104092575 A | 10/2014 |
| CN | 104598369 A | 5/2015 |
| WO | 03009250 A1 | 1/2003 |
| WO | 2014020612 A1 | 2/2014 |

OTHER PUBLICATIONS

Definition of Telemetry, Wikipedia, Oct. 31, 2011.
"International Search Report & Written Opinion Issued in PCT Application No. PCT/US2016/056226", dated Feb. 3, 2017, 12 Pages.
"International Search Report & Written Opinion Issued in PCT Application No. PCT/US2016/056234", dated Feb. 2, 2017, 11 Pages.
Final Office Action for U.S. Appl. No. 14/885,969 dated Feb. 15, 2017 (21 pgs.).
"International Search Report & Written Opinion Issued in PCT Application No. PCT/US2016/056232", dated Feb. 13, 2017, 15 Pages.
"International Search Report & Written Opinion Issued in PCT Application No. PCT/US2016/056240", dated Feb. 2, 2017, 11 Pages.
"Overview of Office Telemetry", Published on: Feb. 23, 2013, 10 pages. Available at https://web.archive.org/web/20130223054520/http://technet.microsoft.com/en-us/library/jj863580.aspx.
"[MS-TPXS]: Telemetry Protocol XML Schema", v20150630, Microsoft Corporation, Jun. 30, 2015, 23 Pages.
Kunic, Adnan, "Converting Mobile Client/Server Telemetry Acquisition System to Enterprise SOA Architecture", Retrieved on: Jul. 2, 2015, 9 pages. Available at: http://diabict.fer.hr/_download/repository/Adnan_Kunic_-_Kvalifikacijski_ispit.pdf.
Office Action for U.S. Appl. No. 14/885,969 dated Sep. 16, 2016 (13 pgs.).
"Second Written Opinion Issued in PCT Application No. PCT/US2016/056232", dated Aug. 22, 2017, 7 Pages.
"Second Written Opinion Issued in PCT Application No. PCT/US2016/056234", dated Aug. 22, 2017, 5 Pages.
"Second Written Opinion Issued in PCT Application No. PCT/US2016/056240", dated Aug. 31, 2017, 6 Pages.
Second Written Opinion Issued in PCT Application No. PCT/US2016/056226, dated Sep. 1, 2017, 5 Pages.
Final Office Action for U.S. Appl. No. 14/885,969 dated Oct. 20, 2017 (22 pgs.).
"International Preliminary Report on Patentability Issued in PCT Application No. PCT/US2016/056226", dated Jan. 8, 2018, 9 Pages.
"International Preliminary Report on Patentability Issued in PCT Application No. PCT/US2016/056232", dated Jan. 8, 2018, 9 Pages.
"International Preliminary Report on Patentability Issued in PCT Application No. PCT/US2016/056234", dated Jan. 8, 2018, 6 Pages.
Office Action for U.S. Appl. No. 14/885,971 dated Feb. 26, 2018 (48 pgs.).
"International Preliminary Report on Patentability Issued in PCT Application No. PCT/US2016/056240", dated Jan. 15, 2018, 7 Pages.
"Log4j", Retrieved From http://www.avajava.com/tutorials/lessons/what-is-log4j-and-how-do-i-use-it.html, Retrieved Date: May 24, 2018, 3 Pages.
"Log4J", Retrieved From: https://en.wikipedia.org/w/index.php?title=Log4j&oldid=618338328, Jul. 24, 2014, 5 Pages.
"Non Final Office Action Issued in U.S. Appl. No. 14/885,969", dated May 31, 2018, 33 Pages.
"Final Office Action Issued in U.S. Appl. No. 14/885,969", dated Oct. 24, 2018, 38 Pages.
"Final Office Action Issued in U.S. Appl. No. 14/885,971", dated Oct. 16, 2018, 16 Pages.
"Non Final Office Action Issued in U.S. Appl. No. 14/885,973", dated Jun. 28, 2018, 18 Pages.
"Final Office Action Issued in U.S. Appl. No. 14/885,973", dated Jan. 28, 2019, 13 Pages.

(56) References Cited

OTHER PUBLICATIONS

"Non Final Office Action Issued in U.S. Appl. No. 14/885,971", dated Feb. 8, 2019, 15 Pages.
"Non Final Office Action Issued in U.S. Appl. No. 14/885,969", dated Apr. 26, 2019, 16 Pages.
"Non Final Office Action Issued in U.S. Appl. No. 14/885,973", dated May 31, 2019, 13 Pages.
"Final Office Action Issued in U.S. Appl. No. 14/885,969", dated Aug. 23, 2019, 19 Pages.
"Final Office Action Issued in U.S. Appl. No. 14/885,971", dated Aug. 13, 2019, 15 Pages.
"Final Office Action Issued In U.S. Appl. No. 14/885,973", dated Oct. 24, 2019, 12 Pages.
Fielding, et al., "Hypertext Transfer Protocol—HTTP/1.1 RFC 2616", Retrieved from:https://dl.acm.org/citation.cfm?id=RFC2616, Jun. 1999, 114 Pages.
"Non Final Office Action Issued in U.S. Appl. No. 14/885,971", dated Feb. 4, 2020, 18 Pages.
"Notice of Allowance Issued in U.S. Appl. No. 14/885,969", dated Mar. 11, 2020, 8 Pages.
"Non Final Office Action Issued in U.S. Appl. No. 14/885,973", dated Apr. 6, 2020, 20 Pages.
"Office Action Issued in European Patent Application No. 16787652.3", dated Apr. 3, 2020, 6 Pages.
"Final Office Action Issued in U.S. Appl. No. 14/885,971", dated Jul. 28, 2020, 17 Pages.
"First Office Action and Search Report Issued in Chinese Patent Application No. 201680060563.7", dated Aug. 4, 2020, 15 Pages.
"First Office Action and Search Report Issued in Chinese Patent Application No. 201680059600.2", dated Aug. 5, 2020, 18 Pages.
"First Office Action and Search Report Issued in Chinese Patent Application No. 201680060249.9", dated Aug. 12, 2020, 28 Pages.
"Final Office Action Issued in U.S. Appl. No. 14/885,973", dated Oct. 19, 2020, 18 Pages.
"Office Action Issued in European Patent Application No. 16787966.7", dated Jun. 9, 2020, 5 Pages.
"Office Action Issued in European Patent Application No. 16787654.9", dated Nov. 25, 2020, 5 Pages.
"Office Action and Search Report Issued in Chinese Patent Application No. 201680059600.2", dated Dec. 30, 2020, 14 Pages.
"Second Office Action and Search Report Issued In Chinese Patent Application No. 201680060563.7", dated Jan. 22, 2021, 11 Pages.
"Second Office Action Issued in Chinese Patent Application No. 201680060249.9", dated Mar. 16, 2021, 5 Pages.
"Third Office Action Issued in Chinese Patent Application No. 201680060563.7", dated Jun. 2, 2021, 7 Pages.
"Non Final Office Action Issued In U.S. Appl. No. 14/885,971", dated Apr. 1, 2021, 17 Pages.
"Office Action Issued in Chinese Patent Application No. 201680059600.2", dated Apr. 8, 2021, 9 Pages.
"Non Final Office Action Issued In U.S. Appl. No. 14/885,973", dated Apr. 19, 2021, 19 Pages.
"Final Office Action Issued in U.S. Appl. No. 14/885,971", dated Sep. 15, 2021, 19 Pages.
"Final Office Action Issued in U.S. Appl. No. 14/885,973", dated Nov. 3, 2021, 19 Pages.

* cited by examiner

TELEMETRY DEFINITION SYSTEM

BACKGROUND

In order to improve the quality of software applications, software developers attempt to understand how the applications perform in the hands of users including customers and clients. While laboratory or development testing, such as debugging and logging, during application development is important in improving quality, laboratory testing alone is seldom sufficient for many modern applications. Modern software applications, especially mobile applications, are highly interactive, and a full range of user interactions are difficult to simulate in a laboratory or during development. Also, a number of environmental conditions effect user experience with applications. For example, network connectivity, GPS-signal quality, and device hardware all vary widely. Some platform APIs can even change behavior depending on the amount of power left in the device battery. These diverse environmental conditions are difficult to reproduce in a laboratory. Thus, many software developers endeavor to collect diagnostic and performance trace data from the field.

Platform support for tracing application performance in the field, however, is typically inadequate. Major platforms, including mobile platforms, provide application crash logs to developers, but developers report difficulty in identifying the causes of crashes from many logs. Further, such data, which may also include unresponsive events and exceptions, does not provide much assistance in detecting performance issues. Analytics frameworks are designed to collect usage analytics such as user demographics rather than performance data. This information typically does not effectively provide information about specific user activity within the application.

Instead, developers that seek meaningful information regarding application performance will include custom tracing code in the application, which is no easy task. For example, even a simple user request in an application triggers multiple asynchronous calls, with complex synchronization between threads, and identifying performance bottlenecks in such code requires correctly tracking causality across asynchronous boundaries. This challenging task is made even more difficult because tracing overhead is preferably kept to a minimum to avoid impact on application performance and also to limit the consumption of scarce resources such as battery and network bandwidth.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A telemetry system, including implementation processes, is described. The telemetry system can communicate with one or more instrumented applications to collect data regarding events from the field and forward correlated and coalesced data to analytics applications for rich analysis. The telemetry system is configured to operate with event definitions having one or more schema sections for declaring and populating data from an event, which is an instantiation of the event definition. The event definition can capture actions or interactions an event author (such as the application developer) wishes to track. The disclosure also includes aspects of a system, method, and computer readable medium for use with a telemetry system that can include automatically, i.e., explicitly, populating a first set of fields in a schema of an event definition using a logging library. The event author can select a second set of fields from another schema.

An event definition can include multiple schema sections configured to include data from an event. In the examples, an event definition includes a first section schema having fields that are automatically populated by the logging library without input from an event author such as an application developer. For example, the first section schema can include a system schema for data that is general to all events such as system data. An event can also include a second section schema that includes fields selected by the event author. For example, a domain section schema includes fields that have broad applicability. In one example, an event author can select zero or more domain section schemas, but the event author does not control the name of the fields or the data types of the fields. Instead, the logging library predefines the fields and types in the selected domain schemas and populates the fields with data. The second section schema can further include a custom schema having fields and types defined by the event author that can be applicable to the event but not otherwise included in the system schema and the domain schema. In one example, the first section schema and the domain section schema are not defined with the event definition; they are common for all event definitions.

An instrumented application can include a telemetry layer. The telemetry layer includes first section schema, or a system schema, that automatically captures common correlating data and can capture information injected with event ingestion components of a telemetry pipeline. The event author can include a second section schema that aligns with the event domain or meaning as well as create fields in a custom schema to include application-specific information related to the event.

In one example, the telemetry system includes a high-volume, low latency event and telemetry platform. The telemetry system can be applied to drive one or more client and services ecosystems. Example systems or processes of the disclosure are able to unify real-time, interactive, event driven workflows from customer to cloud or computer network and back to customer with comprehensive batch telemetry. A strong common schema, with strongly-typed fixed and flexible data fields to fully describe data enables rich analysis. The systems and processes described provide for application developers to quickly and easily create new instrumentation points with relatively low overhead. The strong common schema provides for data to be efficiently collected across multiple platforms.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
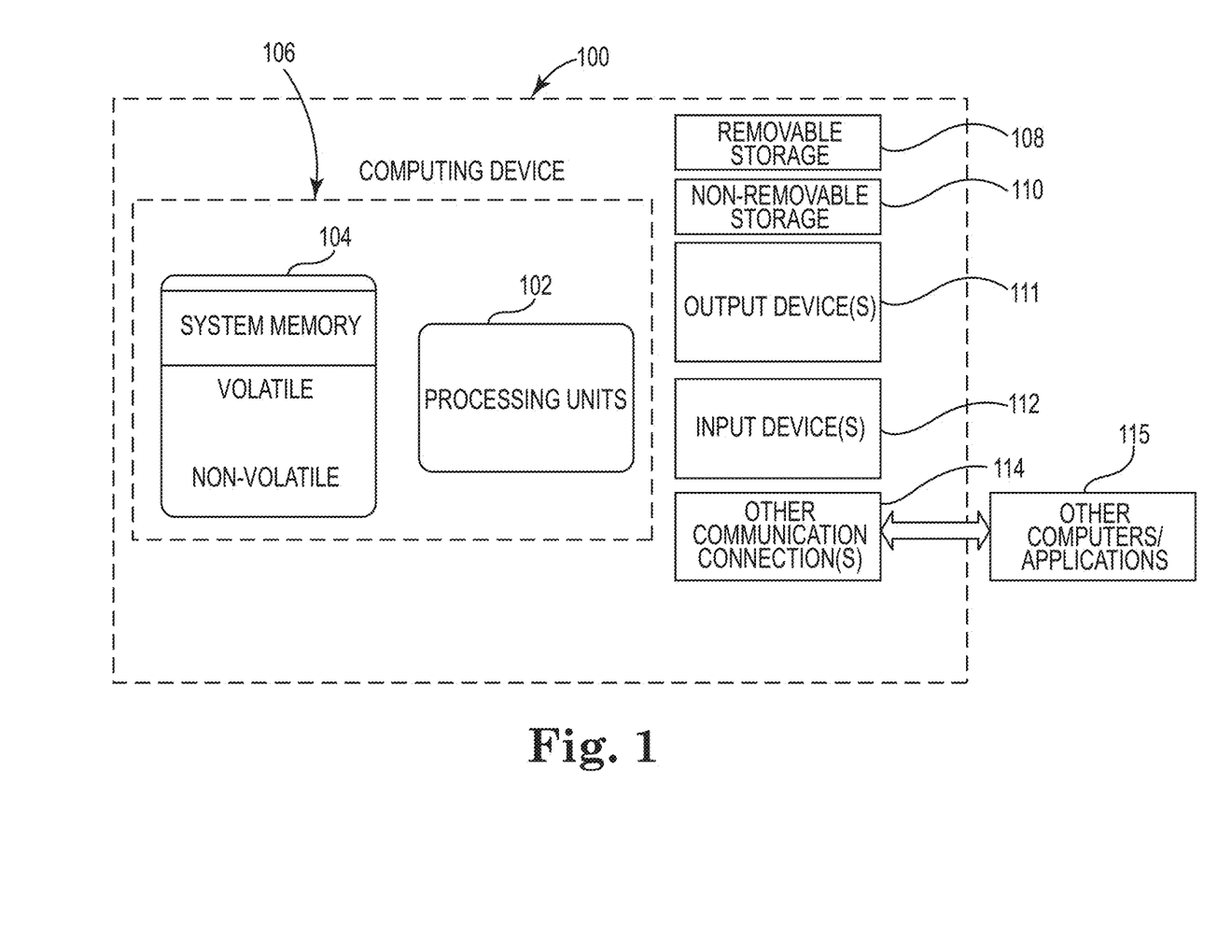
FIG. 1 is a block diagram illustrating an example of a computing device.

FIG. 1 illustrates an exemplary computer system that can be employed in an operating environment and used to host or run a computer application included on one or more computer readable storage mediums storing computer executable instructions for controlling the computer system, such as a computing device, to perform a process. An example of a computer-implemented process includes generation of telemetry data using a telemetry schema that can be stored in a computer memory.

The exemplary computer system includes a computing device, such as computing device 100. In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network, computer cluster, cloud services infrastructure, or other.

Computing device 100 can also have additional features or functionality. For example, computing device 100 may also include additional storage. Such storage may be removable and/or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse), pen, voice input device, touch input device, or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

Figure 2:
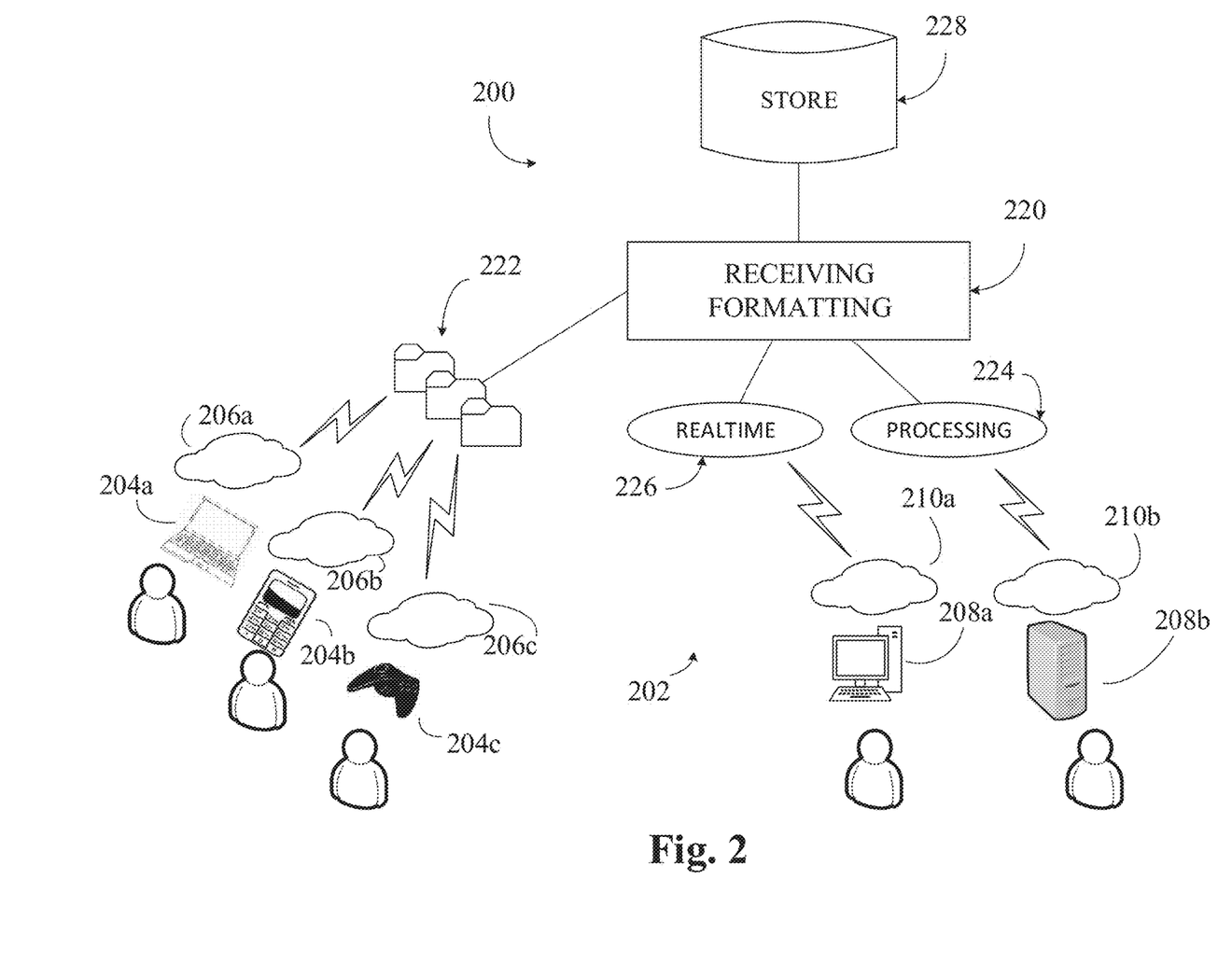
FIG. 2 is a block diagram illustrating an example telemetry system incorporating a computing device.

FIG. 2 illustrates an example telemetry system 200 that can include one or more computing devices, such as computing device 100, in a computer network 202. For illustration, the example telemetry system 200 can communicate with one or more client computing devices, e.g., client devices 204a-204c, executing instrumented software applications 206a-206c and can also communicate with one or more subscriber devices, e.g., subscriber computing devices 208a-208b, executing analytics software applications 210a-210b. In one example, the client devices 204a-204c and instrumented applications 206a-206c initiate communication with the telemetry system 200 over the network 202.

Instrumentation refers to augmenting an application with code that generates data that can be used to monitor or measure the performance and usage of the application, to diagnose errors, and to write trace information, and the like. Programmers implement instrumentation in the form of code instructions that monitor specific components in a system. When an application contains instrumentation code, it can be managed using a management tool to review the performance of the application. Applications can be instrumented for logging and telemetry, which are typically oriented around the internal structure of the application during development and to collect data once the application is released to actual users.

Telemetry is automated remote measurement and data collection. For example, telemetry data can represent information not discoverable during application development such as which configurations customers prefer, how are customers using features in the application, what are the circumstances surrounding errors or crashes, and other information. Telemetry data can include anonymous software versioning information, resource usage, memory access, operating systems in use, and many other examples. Telemetry system 200 provides the tools to collect data and to condense the collected data into analytics, or human-decipherable reports.

In some examples, the user of the instrumented applications 206a-206c can determine which telemetry information to provide to a telemetry system 200. For example, the user can select to retain particular information locally, such as personal or sensitive information, and allow other information to be provided to the analytics software application. The user can choose to not upload such information as telemetry data, and the telemetry system 200 will not have access to personal or sensitive data.

Telemetry design leads to events, or actions the instrumentation will track, and applications are typically instrumented to track a series of distinct actions of or interactions with the application. Telemetry instrumentation is provided by event authors, such as application developers or component developers, and in some examples is imposed on event handlers. In one example, an application developer may wish to track several dozen events in an application. An event definition is a description of a specific event, and includes a list of fields set forth in a contract called a schema that can provide a system for declaring and populating structured data in the example. An event includes actual instantiation of a set of data described in the event definition, and this set of data is logged and transmitted to the telemetry system 200. An event is emitted in response to selected actions or interactions, and the data payload of the event, or event payload, describes attributes and semantics about the stimulus that triggered its creation, effects of the event, or both. An event author creates the event definition and the instrumentation code to populate and transmit the event to the telemetry system 200.

Telemetry system 200 includes, for example, a receiving/formatting system 220, logging library 222, processing system 224, real-time system 226, and event store 228. Telemetry data sent by client devices 204a-204c is received at telemetry system 200, which can then forward events to subscriber devices 208a-208b with low latency. Subscribers, using analytics application 210a-210b, can declare filters to receive relevant data. Telemetry system 200 can be configured to operate with one or more schemas of declaring and populating structured or unstructured data. In one example, receiving/formatting system 220 can be a web service that accepts events provided by client devices 204a-204c over the Internet. Logging library 222 uploads data to the receiving/formatting system 220. Receiving/forwarding system 220 can provide data to processing system 224 for rich analytics, batch processing, and reporting. Receiving/forwarding system 220 can also, or alternatively, provide data to real-time system 226 for real-time, or near real-time, indexing, querying, monitoring, and alerting. For example, real-time system 226 can include an operational deadline from event to system response that is greater than instantaneous. Event store 228 can provide reference information about events to the telemetry system 200.

Figure 3:
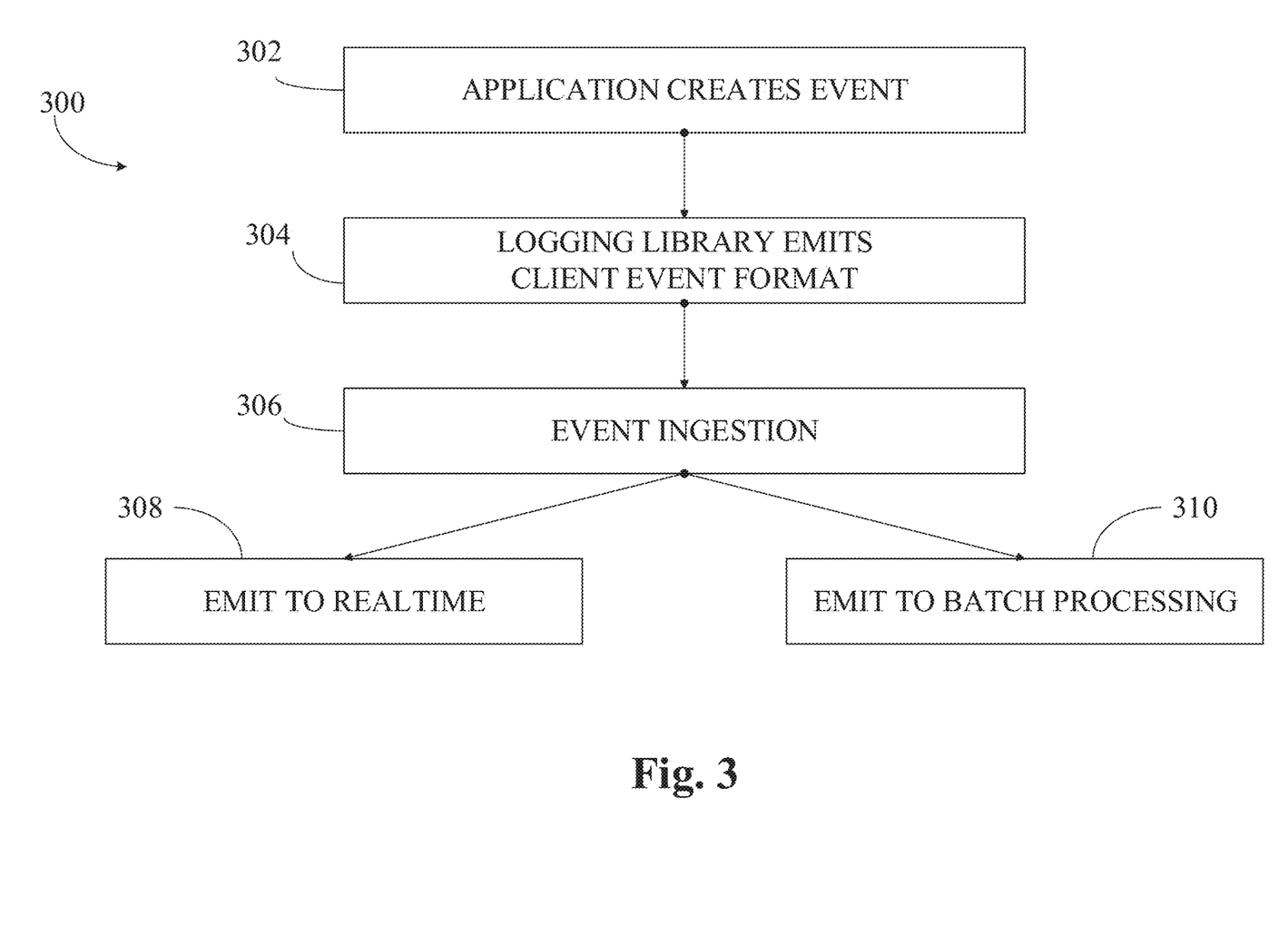
FIG. 3 is a block diagram illustrating an example process of the telemetry system of FIG. 2.

FIG. 3 illustrates an event ingestion pipeline 300 to shuttle events through multiple components of the telemetry system 200. An event payload can vary depending on its stage within the pipeline 300. The event ingestion pipeline can be implemented as a process in one or more computing devices 100 in telemetry system 200. In the example, an instrumented software application, such as applications 206a-206c, emits an application event format to the logging library 222 at 302. Logging library 222 can include a code library that can, for example, accept an event, serialize data for transport, and upload the event to the receiving/formatting system 220. Logging library 222 can include logging libraries for multiple platforms, such as a Java logging library for the Java platform, an Android logging library for the Android platform, as well as other telemetry clients. A first section schema of an event definition includes a set of fields that is automatically populated with data using a logging library. In some examples, other aspects of the telemetry system 200 can also populate the first set of fields. The event author can select a second set of fields from another schema that are also populated in the pipeline.

Logging library 222 emits a client event format to receiving/formatting system 220 at 304. In one example, the different logging libraries dependent on platform can include a common file format to describe event definitions and a format for serialization. In one example, the format to describe event definitions can include a serialization framework for schematized data such as Bond available from Microsoft, Inc. The file format for serialization of payload can include a data-interchange format such as JavaScript Object Notation, or JSON. Receiving/formatting system 220 emits an ingested event format, at 306. Fields of the schema can continue to be populated with data at ingestion. For example, ingestion data can be provided to the first section schema to determine quality of the pipeline. Ingested events can be formatted in JSON and provided to real-time systems, at 308, or batch processing systems, at 310, for example, to allow analytical applications 210a-210b to query for data.

Figure 4:
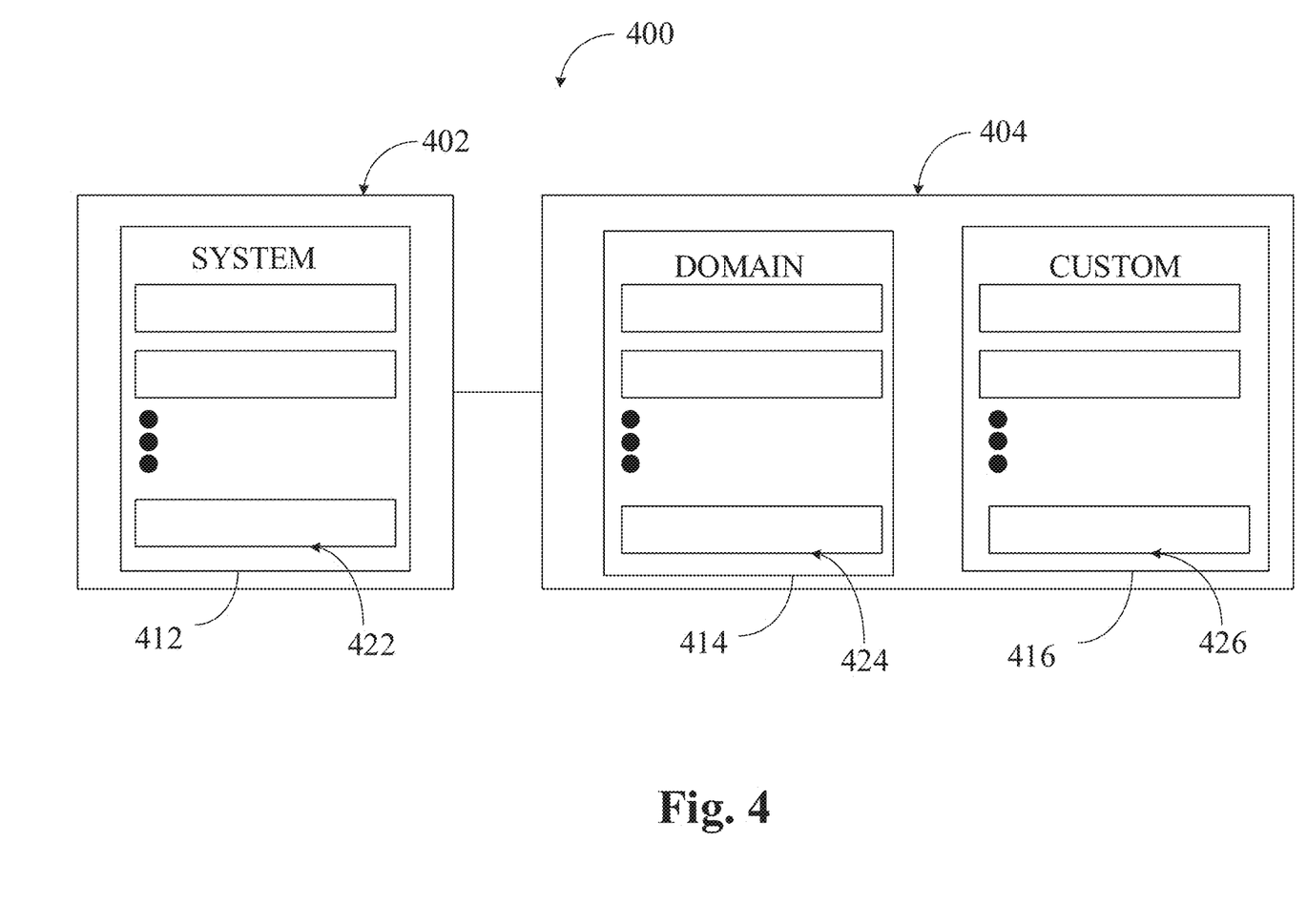
FIG. 4 is a block diagram illustrating an example schema of the telemetry system of FIG. 2.

FIG. 4 illustrates an example event definition 400 for use in telemetry system 200 as a schema, or contract defining a list of fields that are composed into the event definition 400. In the example, event definition includes fields composed into multiple schema sections, referred to in the event definition 400 as a first section schema 402 and second section schema 404. The first section schema 402 in one example include system schema 412 having system fields 422, and second section fields 404 can further include multiple sections such as domain schema 414 having domain fields 424 and custom schema 416 having custom fields 426, which are described in greater detail below. In alternative examples, however, an event may include just fields from the first section 402 and can optionally include fields from the second section 404. In this example, the event definition can optionally include fields from domain schema 414, option include fields from custom schema 416, or, as indicated in event definition 400, fields from both the domain schema 414 and custom schema 416. Event definition 400 can also include annotations that might not appear in the actual event data, such as descriptions, ownership information and field data types. Further, fields can include default values.

Field definitions in the example include a name and a type. Types can include basic data types (such as Boolean, various integer types, floating point numbers, strings), containers (lists, vectors, sets, maps), as well as complex types. In one example, types can be selected from those supported in the serialization framework. Not all complex types, however, supported in the serialization framework may be supported in the data-interchange format. In such cases, complex types in the serialization format can be converted to string type.

The example of an event represented in JSON includes:

```
{
    // First Section Schema (system fields)
    "ver" : <Schema version>,
    "name" : <Event name>,
    ...
    "data" : {
        // Second Section Schema
        "baseType" : "<Domain Section name>",
        "baseData" : {
            // Domain Section fields
            ...
        },
        // Custom Section fields
        ...
    }
}
```

First section schema 402 includes fields 422 defined by and automatically populated by the logging library 222 present on the local system where events are sent in the pipeline, such as in pipeline 300. In one example, first section schema 402 captures common correlating fields and can relate to the system of the instrumented software application, such as applications 206a-206c, and can represent system data. First section schema 402 can also capture information injected by event ingestion components in pipeline 300. First section schema 402 includes fields typically applicable to all events from the instrumented application, and can include items such as event time, event name, and Internet Protocol address of sender. In some examples, first section schema 402 can include fields 422 the logging library obtains from a caller in addition to values that are automatically filled. In one example, all events use the same first section schema.

First section schema 402 includes fields 422 that are universal and applied to all events that flow through the telemetry system 200, and the design of the schema 402, including the selection of the particular fields 422 to include, can be guided by various principles such as consistent identifiers across diverse applications and platforms such as operating systems as well as care taken to consider the effect on application overhead. First section schema enables correlation and is available for automatic instrumentation using the logging library 222. In one example, the first section schema 402 can include an event envelope semantic and an ingest section.

The event envelope includes a data payload used to transmit event information between components of the pipeline 300. The payload can include the original event and a defined set of event sections. The event envelope semantic can include fields 422 such as schema version, name of the event, time (including date), sample rate, sequence to track order of uploaded events, instrumentation key, flags, device identifier that can be resilient to system builds or hardware replacements, operating system, operating system versions including branch and build information, application identifier, application version, user identifier, and, in some examples, a property bag for custom logging library fields.

The ingest section can be filled at ingestion time. Fields for the ingest section can include time when event was received by the receiving/formatting system 220, the remote address seen by the receiving/formatting system 220 when the event was accepted, event authentication, and event quality.

Second section schema 404 includes optional domain schema 414, custom schema 416, or both. Second section schema 404 includes fields 424, 426 that are populated by code written by the event author rather than the logging library 222. In one example, second section schema 404 includes domain schema 414 having predefined fields 424, such as defined by the telemetry system 200 or other centralized groups, and the event author does not control the names of the fields 424 or data types of the fields 424. Custom schema 416 is created by an event author and can be used for scenarios or aspects of events that are application-specific and for which no domain field 424 exists. Templates can be applied to second section schema 404 to support reuse of fields 424, 426 that are commonly defined across several events. In one example, templates are used for domain schema 414. Templates support defining a set of fields that can be consistently reused across multiple event definitions and, in some example, when multiple event definitions include different domain fields 424.

In one example, domain schema 414 is relevant to a particular scenario or aspects of events that are common across many different applications. For example, fields 424 in domain schema 414 can include logging an error, application start event, application end event, web services API (application program interface) call success, API call failure, and many other examples. A wide variety of applications and events can define events from domain schema fields 424 and thus include similar fields and data. Thus, a set of common reports and analytics can be built to consume all events from all applications on platforms that use the same domain schema 414. Event templates are analogous to abstract classes that allow, for example, a centralized group to share a set of fields that several related events include. In one example, domain fields 424 can be late-bound and chosen when the event is defined.

Domain schemas 414 are generalized to enable broad applicability. For example, a domain schema MediaUsage can exist rather than more specific domain schemas such as play song, stop song, play video, stop video, or the like, which are more specific but use a schema per media player, for example. The following includes a Bond representation of the structure of a domain schema for MediaUsage example. In the following example, field names are in camelCasing and structs (records that are used to store more than one value), namespaces, and event short names are in PascalCasing. Types include strings, unsigned integers with 32 bits, and unsigned integers with 64 bits.

```
namespace Ms.Media
[Description("Media Usage Telemetry")]
struct MediaUsage : Microsoft.Telemetry.Domain
{
    [Description("The type of media being played.")]
    10: string mediaType;
    [Description("Length of the media in milliseconds")]
    20: uint64 lengthMs;
    [Description("The specific Media Usage event being performed
    by the player/tuner (see spec online for enumerated values")]
    30: uint32 action;
    [Description("Time position in the stream/playback in
    milliseconds. 0 represents the beginning of the media.")]
    40: uint64 positionMs;
};
```

Custom schema 416 is created and defined by the event author. In one example, the event author can determine the name and data type of the custom fields 426. The event author is also responsible for populating the custom fields 426 when an event is instantiated.

The following example portions of an event includes domain schema 414 and custom schema 416:

```
namespace Ms.Media;
struct Played : Microsoft.Telemetry.Data<Ms.Media.MediaUsage>
{
  10: int3 sessionDurationSec:
};
```

In the example, Played is a telemetry data that uses the MediaUsage template that is extended to add a custom field sessionDurationSec.

In following example, a portion of an event is defined to include a domain schema 414 but no custom schema 416 to just reference the domain schema in Microsoft.Telemetry.Data<T> with an empty field declaration:

```
namespace Ms.Media;
struct Played : Microsoft.Telemetry.Data<Ms.Media.MediaUsage>
{
};
```

In the following example, a portion of an event is defined to include a custom schema 416 but no domain schema 414. In this example, an event is fired when a user sets a volume to the maximum level and the event author defines custom schema 416:

```
namespace Ms.Media;
struct VolumeAtMax : Microsoft.Telemetry.Base
{
  10: int32 volumeLevel;
};
```

In the above example, an event can be defined without a domain schema and can be inherited from a Base to give the event only custom fields 426.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of operating a telemetry system to collect telemetry data of an instrumented application, the method comprising:
   implementing an event ingestion pipeline to shuttle events through multiple components of the telemetry system;
   determining quality of the event ingestion pipeline by ingesting telemetry data to a first section schema of a schema in an event definition;
   automatically populating a first set of fields in the first section schema with the telemetry data from the instrumented application using a logging library of the telemetry system, the first set of fields including fields that are universal to events that flow through the telemetry system, the instrumented application augmented with code to generate data to monitor or measure performance of specific user activity of the instrumented application after a development of the instrumented application; and
   populating a second set of fields in a second section schema of the schema selected by a developer during the development of the instrumented application.

2. The method of claim 1 wherein populating the second set of fields includes preselected fields from the telemetry system.

3. The method of claim 2 wherein the preselected fields are populated with data common to a plurality of applications.

4. The method of claim 2 wherein the preselected fields include a predefined name and data type.

5. The method of claim 1 wherein populating the second set of fields includes custom fields from the developer.

6. The method of claim 5 wherein the custom fields include custom name and custom data type.

7. The method of claim 1 wherein the first set of fields is automatically populated with data common to all events.

8. The method of claim 7 wherein the data common to all events includes client system data.

9. The method of claim 1 wherein the first set of fields in the schema includes an event envelope semantic.

10. The method of claim 1 wherein populating the second set of fields includes preselected fields from the telemetry system and custom fields from the developer.

11. A telemetry system to collect telemetry data of an instrumented application, comprising:
   a computing device including a processor and a memory configured to:
   implement an event ingestion pipeline to shuttle events through multiple components of the telemetry system;
   determine quality of the event ingestion pipeline by ingesting telemetry data to a first section schema of a schema in an event definition;
   automatically populate a first set of fields in the first section schema with the telemetry data from the instrumented application using a logging library of the telemetry system, the first set of fields including fields that are universal to events that flow through the telemetry system, the instrumented application augmented with code to generate data to monitor or measure performance of specific user activity of the instrumented application after a development of the instrumented application; and
   populate a second set of fields in a second section schema of the schema selected by a developer during the development of the instrumented application.

12. The telemetry system of claim 11 wherein populating the second set of fields includes preselected fields from the telemetry system.

13. The telemetry system of claim 11 wherein populating the second set of fields includes custom fields from the developer.

14. The telemetry system of claim 11 wherein the telemetry system communicates with an instrumented application over a computer network.

15. The telemetry system of claim 14 wherein the instrumented application initiates communication with the telemetry system.

16. The telemetry system of claim 14 wherein the logging library includes a code library corresponding with a platform of the instrumented application.

17. A computer readable storage medium, which does not include a transitory propagating signal, storing computer executable instructions for controlling a computing device to perform a method comprising:

implementing an event ingestion pipeline to shuttle events through multiple components of the telemetry system;

determining quality of the event ingestion pipeline by ingesting telemetry data to a first section schema of a schema in an event definition;

automatically populating a first set of fields in the first section schema with telemetry data using a logging library of a telemetry system, the telemetry system to collect the telemetry data from an instrumented application, the first set of fields including fields that are universal to events that flow through the telemetry system, the instrumented application augmented with code to generate data to monitor or measure performance of specific user activity of the instrumented application after a development of the instrumented application; and populating a second set of fields in a second section schema of the schema selected by a developer during the development of the instrumented application.

18. The computer readable storage medium of claim 17 wherein an event is represented in a data-interchange format.

19. The computer readable storage medium of claim 17 wherein the first set of fields in the schema includes an event envelope semantic.

20. The computer readable storage medium of claim 17 wherein populating the second set of fields includes preselected fields from the telemetry system and custom fields from the developer.

* * * * *